United States Patent [19]

Fernandez-Rubio

[11] Patent Number: 5,177,360

[45] Date of Patent: Jan. 5, 1993

[54] DEVICES AND METHOD TO CONFIRM THE AUTHENTICITY OF ART OBJECTS

[76] Inventor: Francisco J. Fernandez-Rubio, 1505 Gettysburg Landing. St. Charles. Mo. 63303

[21] Appl. No.: 720,609

[22] Filed: Jun. 25, 1991

[51] Int. Cl.⁵ ............................................... G01T 1/36
[52] U.S. Cl. .................................... 250/303; 250/395; 283/70
[58] Field of Search ............... 250/303, 271, 395, 302; 283/70, 72, 85, 901

[56] References Cited

U.S. PATENT DOCUMENTS 4,571,492 2/1986 Kane et al. ........................... 250/303
4,765,655 8/1988 Crihan ................................... 283/70

Primary Examiner—Carolyn E. Fields

[57] ABSTRACT

Art objects are authenticated by using a pair of sealed radioactive sources emitting identical gamma ray spectra unique to that pair. One of the sources is attached to a particular, assigned art object. The surface of the other source is engraved with information relevant to the identity of the particular art object. At a late date, the gamma ray spectra of both sources are obtained and compared, and if they are identical, the art object is authenticated.

7 Claims, 4 Drawing Sheets

STEP I

A PAIR OF SEALED RADIOACTIVE SOURCES, IDENTIFIED AS A LABEL-SOURCE AND A MASTER-SOURCE RESPECTIVELY, EMITTING IDENTICAL GAMMA-RAY SPECTRA IS PREPARED AND ASSIGNED TO A PARTICULAR ART OBJECT.

THE LABEL-SOURCE IS PERMANENTLY ATTACHED TO THE ART OBJECT.

INFORMATION RELEVANT TO THE ART OBJECT IS ENGRAVED ON THE SURFACE OF THE MASTER-SOURCE.

FIG-5A

STEP II

WHENEVER IT IS REQUIRED TO VERIFY THE AUTHENTICITY OF THE ART OBJECT:

THE LABEL-SOURCE ATTACHED TO THE ART OBJECT IS ASSAYED TO OBTAIN ITS GAMMA-RAY SPECTRUM.

THE MASTER-SOURCE, ENGRAVED WITH INFORMATION RELEVANT TO THE ART OBJECT, IS ASSAYED TO OBTAIN ITS GAMMA-RAY SPECTRUM.

THE GAMMA-RAY SPECTRA OBTAINED FROM THE LABEL-SOURCE AND FROM THE MASTER-SOURCE ARE COMPARED TO ONE ANOTHER.

IF THE GAMMA-RAY SPECTRA ARE IDENTICAL TO ONE ANOTHER, THE AUTHENTICITY OF THE ART OBJECT IS CONFIRMED.

FIG-5B

DEVICES AND METHOD TO CONFIRM THE AUTHENTICITY OF ART OBJECTS

BACKGROUND—FIELD OF THE INVENTION

This invention relates generally to the authentication of art objects and more specifically to the use of a pair of specially fabricated sealed radioactive sources that is uniquely assigned to a particular art object for the purpose of confirming the authenticity of said art object at a later date.

The identification of any particular art object relies upon the comparison between some specific features unique to the art object in question and a record of these same features that has been previously recorded and stored in some means.

In the field of the visual arts, the identification of an original art object, such as a painting or a sculpture, has become increasingly difficult, particularly after several years from its creation, and moreover, if the art object has not remained under reliable surveillance at all times.

Such difficulties are caused by the availability of new technologies that allow the creation of copies or reproductions of original art objects in very accurate detail. These technologies, in the hands of unscrupulous individuals have led to numerous cases of fraud in recent history.

Particularly in the field of painting, with the availability of the current technologies, the forging of signatures, the artificial aging of canvas and the reproduction of color pigments and brush strokes, are not serious obstacles to art forgery.

The most common and expeditious method currently used by the art experts to identify art objects is based on photographic techniques. However, the long term accuracy of such method may be impaired by alterations that could occur in the photographic records and/or in the original art object due to adverse storage conditions particularly if the art object in question had disappeared for an extended period of time.

BACKGROUND—DESCRIPTION OF PRIOR ART

The use of radioisotopes to identify valuable objects have been previously disclosed in U.S. Pat. No. 4,765,655 issued to Crihan on Aug. 23, 1988 and in U.S. Pat. No. 4,571,492 issued to Kane et al on Feb. 18, 1986; however, there are various disadvantages to the inventions described in these patents that reduce the effectiveness of their application in the identification of art objects.

In Crihan's invention, the use of a single radioisotope and the measurement of only the level of radiation emitted by said single radioisotope is easy to duplicate on a forged art object by a person knowledgeable in the field of the invention who may have access to either the information recorded in the record card or to the marked art object.

A radioactive isotope disposed on an art object in the manner described in Crihan's invention is not likely to maintain indefinitely its physical integrity to allow for an accurate measurement of its radioactivity years later.

The possible flaking and/or peeling of the radioisotope support medium under various environmental conditions or the intentional manipulation, such as scraping, of said support medium would render a subsequent radioactivity measurement inaccurate for identification purposes.

The method described in Crihan's invention to identify a radioactively marked art object requires mathematical computations of the result of any radioactivity measurement in order to account for the natural nuclear decay of the radioisotope disposed on the art object.

The various radioisotopes claimed in Crihan's invention are not suitable for use in the manner described in his invention for the identification of art objects.

Am-241 and Ra-226 are alpha-particle emitters and require metallic and sealed encapsulation according to the United States federal regulations regarding the possession and use of radioactive materials.

Bi-209, Pt-190 and Pt-192 are non-radioactive isotopes.

C-14 is not a gamma-ray emitte. The beta particles emitted by this radioisotope can not be measured by conventional radioactivity detection apparatus connected to a scalar rate-meter as claimed in the invention.

I-129 is extremely volatile and requires encapsulation.

In Kane's invention, the manner in which the plurality of radioisotopes is disposed on the object is not likely to maintain indefinitely its physical integrity to allow for an accurate measurement, years later, of the gamma-ray spectrum emitted by said plurality of radioisotopes.

The possible flaking and/or peeling of the radioisotope support medium under various environmental conditions or the intentional manipulation, such as scraping, of said support medium would render a subsequent measurement of the gamma-ray spectrum inaccurate.

The method described in Kane's invention to identify an object is based on the evaluation of the gamma-ray spectrum emitted by a plurality of radioisotopes disposed on an object to determine the abundance of each radioisotope in the plurality by means of mathematical calculations. Adjustments to said calculations are required to account for the natural nuclear decay experienced by each radioisotope in the plurality.

All the radioisotopes claimed in Kane's invention, with the exception of Na-22, are not suitable for the authentication of art objects years after the marking of said art objects due to the short half-life of said radioisotopes.

OBJECTS AND ADVANTAGES

The object of my invention is to provide the owners, depositaries and insurers of art objects with unique devices and a method to quickly, unambiguously and unequivocally confirm the authenticity of said art objects for at least one hundred years. Said devices are virtually impossible to forge and will guarantee the future buyers and sellers of an art object the authenticity of said art object. If an art object should be lost or stolen and later found or retrieved, my invention can be used to absolutely confirm the authenticity of said art object and to provide proof that said art object is not a forgery.

Several advantages of my invention are:
a) The devices used to label the art objects are virtually impossible to forge.
b) The devices used to label the art objects can not be altered either intentionally or by adverse environmental conditions which could possibly cause alterations to the art object itself.
c) The plurality of radioisotopes contained in the device used to label a particular art object is chosen in order to be unique for said particular art object and to allow the accurate identification of said particular art object for at least one hundred years.

d) The method used to identify a labelled art object does not require any mathematical computation or adjustments to the result of the measurements.

Further objects and advantages of my invention will become apparent from a consideration of the drawings and ensuing description of it.

DESCRIPTION OF DRAWINGS

In FIG. 2A the cavity 20 is shown empty.

In FIG. 4A the cavity 40 is shown empty.

FIGS. 5A and 5B are charts describing the sequential steps of the method used in my invention to confirm the authenticity of art objects.

LIST OF REFERENCE NUMERALS

Figure 1:
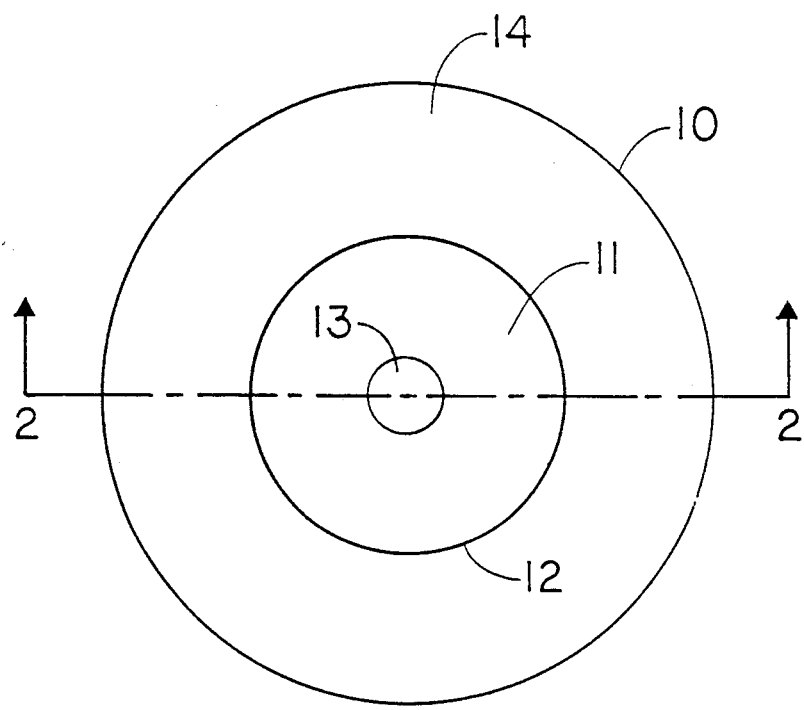
FIG. 1 is a plan view of the body of a Label-Source. The Label-Source is to be attached to the art object.

10—Backing plate of the Label-Source
11—Frontal plate of the Label-Source
12—Welded joint between backing plate 10 and frontal plate 11 of the Label-Source
13—Opening of cavity 20 of the Label-Source
14—Front surface of backing plate 10 of Label-Source
15—Back surface of backing plate 10 of Label-Source
20—Cavity of Label-Source
21—Surface of the bottom of cavity 20 of Label-Source
22—Circular groove
23—Metallic bead compressed into cavity 20 of the Label-Source
30—Backing plate of the Master-Source
31—Frontal plate of the Master-Source
32—Welded joint between backing plate 30 and frontal plate 31 of the Master-Source
33—Opening of cavity 40 of the Master-Source
34—Front surface of backing plate 30 of the Master-Source
35—Back surface of backing plate 30 of the Master-Source
40—Cavity of the Master-Source
41—Surface of the bottom of cavity 40 of the Master-Source
43—Metallic bed compressed into cavity 40 of the Master-Source
50—Label-Source attached to an art object
51—Body of an art object
52—Gamma-ray detector
53—Multi-channel pulse analyzer with data storing and displaying means
60—Master-Source

DESCRIPTION OF THE INVENTION

My invention comprises the fabrication of a pair of sealed radioactive sources, called herein Label-Source and Master-Source respectively, that is uniquely assigned to a particular art object, and a method to use said pair of sealed radioactive sources to confirm the authenticity of said art object.

1. Devices

Each Label-Source/Master-Source pair is fabricated in the following manner:

a) Construction of a Label-Source and of a Master-Source

Figure 2A:
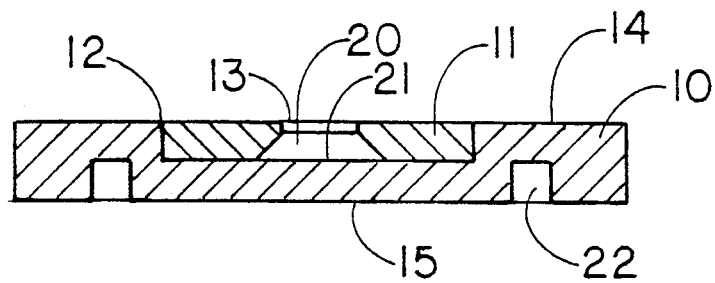
FIG. 2A is a cross sectional view in detail of the portion indicated by the section line 2—2 in FIG. 1.

FIGS. 1 and 2A illustrate a preferred embodiment of a Label-Source. A frontal plate 11 shaped as a circular disc is drilled thru its center with an appropriate drill bit to form the surface of a truncated cone which constitutes the wall of a cavity 20.

A backing plate 10 shaped as a circular disc is counterbored in the center of its front surface 14 to allow for the insertion of the frontal plate 11. Frontal plate 11 and backing plate 10 are joined together by welding means 12 along the periphery of frontal plate 11.

A circular groove 22 is milled on the back surface 15 of backing plate 10. Both, frontal plate 11 and backing plate 10, are made out of an oxidation-resistant metal such as, but not limited to, stainless steel.

Figure 3:
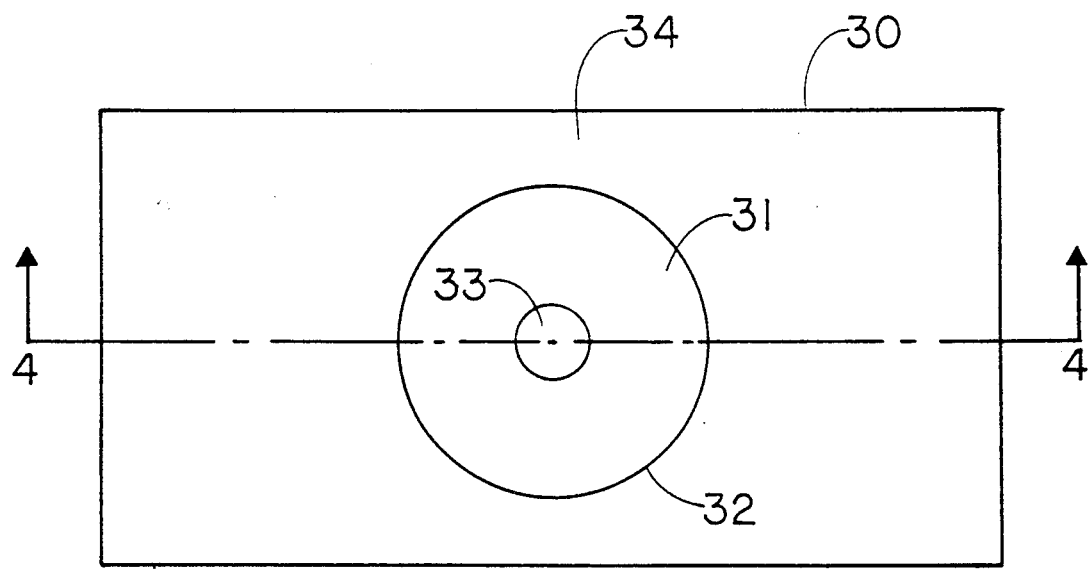
FIG. 3 is a plan view of the body of a Master-Source. The Master-Source contains, engraved on either or both surfaces 34 and 35 (engraving not shown), information relevant to the art object labelled with the Label-Source.
Figure 4A:
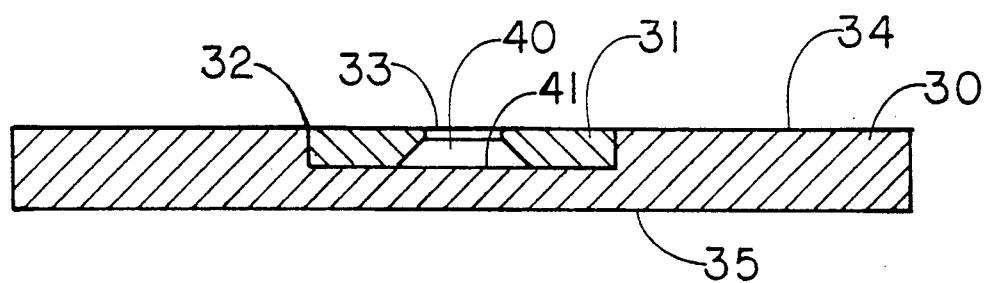
FIG. 4A is a cross sectional view in detail of the portion indicated by the section line 4—4 in FIG. 3.

FIGS. 3 and 4A illustrate a preferred embodiment of a Master-Source. A frontal plate 31 shaped as a circular disc is drilled thru its center with an appropriate drill bit to form the surface of a truncated cone, which constitutes the wall of a cavity 40. A backing plate 30 in the shape of a rectangle is counterbored on its front surface 34 to allow for the insertion of the frontal plate 31. Frontal plate 31 and backing plate 30 are joined together by welding means 32 along the periphery of frontal plate 31. Both, frontal plate 31 and backing plate 30 are made out of an oxidation-resistant metal such as, but not limited to, stainless steel.

Cavity 20 in the Label-Source and cavity 40 in the Master-Source are identical.

b) Dispensing the radioisotopes in the Label-Source and in the Master-Source

Identical volumes of a solution containing a plurality of gamma-ray emitting radioisotopes is dispensed with pipeting means through opening 13 onto the bottom surface 21 of cavity 20 of the Label-Source and through opening 33 onto the bottom surface 41 of cavity 40 of the Master-Source.

The total amount of radioactivity dispensed is small enough to qualify as "exempt quantity" under the regulations established by the United States Nuclear Regulatory Commission.

The amount of radioactivity of each radioisotope in said plurality is selected in such a manner that the proportion of the amount of radioactivity of each radioisotope relative to the amount of radioactivity of the rest of the radioisotopes in said plurality and/or the total amount of radioactivity of each radioisotope in said plurality is unique to each Label-Source/Master-Source pair.

A list of preferred radioisotopes suitable to be used in said plurality is shown in the following table.

TABLE 1

| Radioisotope | Half-life |
|---|---|
| Aluminum-26 | 7.3 × 10 yr |
| Titanium-44 | 47.0 yr |
| Cadmium-113m | 14.6 yr |
| Tin-121m | 50.0 yr |
| Cesium-137 | 30.2 yr |
| Promethium-145 | 17.7 yr |
| Samarium-151 | 93.0 yr |
| Europium-152 | 13.4 yr |
| Europium-154 | 8.2 yr |
| Terbium-157 | 150.0 yr |
| Bismuth-207 | 38.0 yr |

The identical volumes of the radioactive solutions dispensed in the Label-Source and in the Master-Source respectively are allowed to evaporate under the heat produced by an infrared lamp.

c) Sealing the Label-Source and the Master-Source

After the solvent portion of said dispensed radioactive solution has evaporated, leaving the dry radioactive salts of the radioisotopes deposited at the bottom of cavity 20 and cavity 40 respectively, opening 13 of cavity 20 and opening 33 of cavity 40 are sealed, by introducing a metallic bead through each one of said openings of said cavities.

Said metallic beads are then compressed into said cavities by means of a compressing apparatus such as, but not limited to, a hydraulic press.

Under the pressure produced by the compressing apparatus, the metallic bead adopts the shape of the cavity providing an effective metal-to-metal seal against the wall of the cavity to prevent any leakage of the radioactive material contained in said cavity.

Figure 2B:
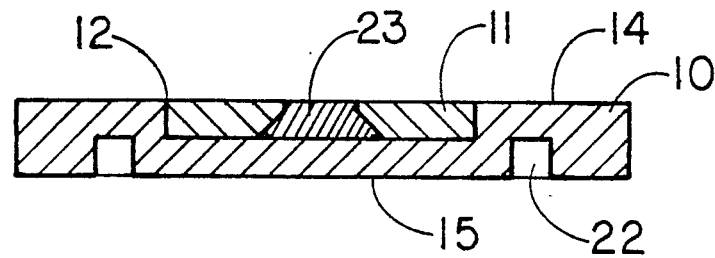
FIG. 2B is the same cross sectional view as in FIG. 2A showing the cavity 20 filled with a metallic bead 23.

FIG. 2B shows a metallic bead 23 compressed inside cavity 20 of the Label-Source.

Figure 4B:
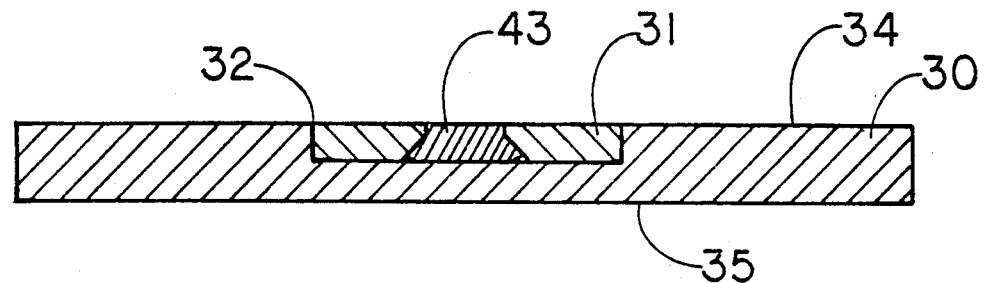
FIG. 4B is the same cross sectional view as in FIG. 4A showing the cavity 40 filled with a metallic bead 43.

FIG. 4B shows a metallic bead 43 compressed inside cavity 40 of the Master-Source.

Said metallic beads are identical and are made out of a ductile and oxidation-resistant metal such as, but not limited to, gold or platinum.

In addition to producing a metal-to-metal seal to confine the plurality of radioisotopes inside said cavities, the metallic beads provide the gamma-ray spectrum emitted by said plurality of radioisotopes with unique characteristics produced by the attenuation effect experienced by the gamma rays as they travel through the compressed metallic beads.

Once a Label-Source and a Master-Source in a pair have been sealed, they are assayed according to the method described in the following section in order to confirm that their gamma-ray spectra are identical to one another.

2. Method

The charts in FIGS. 5A and 5B are abbreviated descriptions of the sequential steps of the method object of my invention that is employed to confirm the authenticity of art objects.

Step I:

A Label-Source/Master-Source pair fabricated according to my invention is assigned to a particular art object.

The Label-Source is permanently attached to the assigned art object at any suitable surface of said art object. The permanent attachment is achieved by means of an adhesive substance such as, but not limited to, an epoxy resin. Said adhesive substance is dispensed inside and along a groove 22 milled in the back surface 15 of backing plate 10 shown in FIG. 2A. The attachment is done with care to avoid inflicting any damage to the art object.

The type and bonding strength of the adhesive substance is selected so as to insure that the removal of the Label-Source subsequent to its attachment to the art object will cause permanent damage to the art object.

The Master-Source is engraved with information relevant to the identity of the art object to which the Label-Source has been permanently affixed.

The engraving of said information is performed with engraving means on either or both surfaces 34 and 35 shown in FIG. 4A. The engraved Master-Source is kept by the owner, insurer or depositary of said art object at a location different from the location where said art object is kept until a time when the confirmation of the authenticity of said art object is required.

Step II:

At any time that a confirmation of the authenticity of said art object is required, the Label-Source attached to said art object and the Master-Source with the engraved information relevant to said art object are assayed and their respective gamma-ray spectra are compared to one another.

If both gamma-ray spectra are identical, the authenticity of said art object is confirmed.

Figure 6:
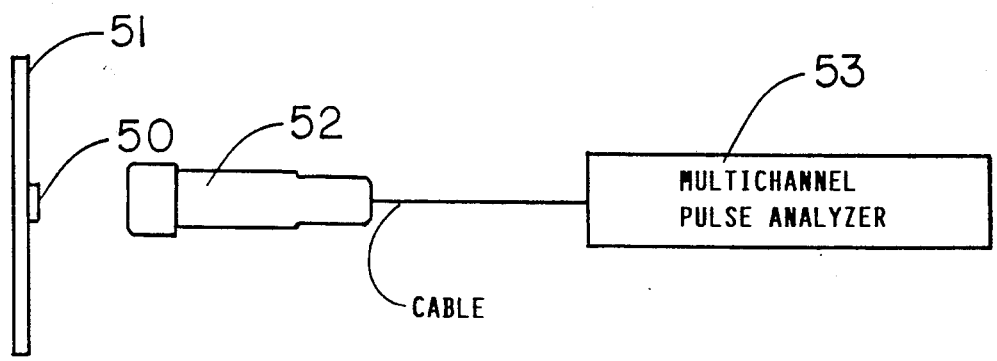
FIG. 6 is one embodiment illustrating a schematic block diagram of the method employed in my invention to assay a Label-Source attached to an art object to obtain the gamma-ray spectrum emitted by said Label-Source.

FIG. 6 illustrates a schematic block diagram of a preferred embodiment of the method, object of my invention, employed to assay the Label-Source.

A suitable energy-responsive gamma-ray detector 52 such as, but not limited to, a sodium iodide crystal with its associated photomultiplier tube and power supply is positioned at a selected distance in front of the Label-Source 50 attached to the body of the art object 51. The multi-channel pulse analyzer 53 connected to said energy-responsive gamma-ray detector 52 is set to count the gamma rays detected by said energy-responsive gamma-ray detector 52 for a selected time interval. The gamma-ray spectrum acquired during said selected time interval by said multi-channel pulse analyzer 53 is stored in the data storing means of said multi-channel pulse analyzer 53.

Figure 7:
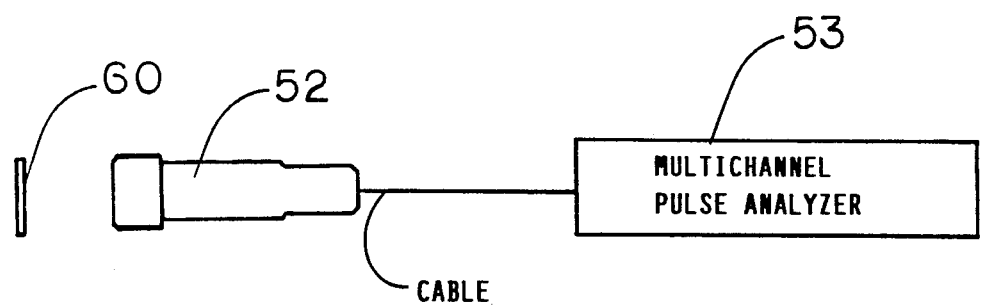
FIG. 7 is one embodiment illustrating a schematic block diagram of the method employed in my invention to assay a Master-Source to obtain the gamma-ray spectrum emitted by said Master-Source.

FIG. 7 illustrates a schematic block diagram of a preferred embodiment of the method, object of my invention, employed to assay the Master-Source.

The same energy-responsive gamma-ray detector 52 used to assay the Label-Source is positioned in front of the Master-Source 60 at the same selected distance used to assay the Label-Source 50.

After counting for the same selected counting time interval used to acquire the gamma-ray spectrum of the Label-Source, the gamma-ray spectrum of the Master-Source is acquired by the same multi-channel pulse analyzer 53 used to acquire the gamma-ray spectrum emitted by the Label-Source.

The gamma-ray spectrum emitted by the Master-Source and acquired by the multi-channel pulse analyzer 53 is stored in the data storing means of the multi-channel pulse analyzer 53.

The gamma-ray spectra emitted by both the Label-Source and the Master-Source, respectively, that are stored in said data storing means of said multi-channel pulse analyzer 53, is then retrieved and compared to one another.

If the compared gamma-ray spectra are identical to one another the authenticity of the art object is confirmed.

EXAMPLES OF APPLICATION OF THE INVENTION

Example 1

A private art collector owns several valuable original paintings that have been labelled with Label-Sources at the request of his insurer. A few years after the labelling of the paintings a fire completely destroys one of the labelled paintings.

The art collector, fraudulently, claims that his most valuable painting was the destroyed one.

The Label-Source attached to the destroyed painting was the only thing that survived the fire.

The insurance company compares the gamma-ray spectrum of the Label-Source found among the ashes of the destroyed painting with the gamma-ray spectrum of the Master-Source that contains the engraved description of the painting claimed by the art collector to be the one destroyed by the fire. The compared spectra are different.

After comparing the gamma-ray spectrum of the Label-Source found among the ashes of the destroyed painting with the gamma-ray spectra of all the Master-Sources kept by the insurance company, the identity of the destroyed painting is finally determined to be one of lesser value than the one claimed by the art collector as being destroyed by the fire.

On the basis of this evidence, the private art collector is indicted for attempted insurance fraud.

Example 2

A valuable masterpiece labelled with a Label-Source is stolen from a museum.

Several years later a person claims to have found, in the attic of an abandoned house, what seems to be the stolen masterpiece and requests a substantial reward.

Case A:

The work of art found does not have a Label-Source attached to it, and furthermore, it does not show any sign of damage which would have occurred if the Label-Source was removed.

The found work of art is suspected to be a fake. Further investigation demonstrated that the work of art found is indeed a copy of the stolen masterpiece.

Case B:

The work of art found has a Label-Source attached to it. The gamma-ray spectrum of this Label-Source and that of the Master-Source engraved with information relevant to the stolen masterpiece are compared and found to be different. The work of art found is declared a fake.

It is found, upon further investigation, that at some point in time after the robbery was committed, the robbers procured a copy of the original masterpiece and hired the services of an expert craftman who made a copy of the Label-Source attached to the original masterpiece with its exact external appearance. Furthermore, the faked Label-Source was loaded with a mixture of radioisotopes in order to simulate the radiation emitted by the original Label-Source.

Case C:

The work of art found has a Label-Source attached to it. The gamma-ray spectrum of this Label-Source and that of the Master-Source engraved with information relevant to the stolen masterpiece are compared and found to be identical, hence the authenticity of the found work of art is confirmed and the reward is issued.

CONCLUSION, RAMIFICATIONS AND SCOPE OF MY INVENTION

The reader will see that my invention provides reliable, fast, and a long term and accurate means to confirm the authenticity of art objects. Furthermore, from the description of my invention the reader will see that it is virtually impossible to alter or reproduce the gamma-ray spectra of any Label-Source/Master-Source pair assigned to a particular art object, therefore preventing any fraudulent attempt to authenticate a copy of the original art object.

A particular Label-Source/Master-Source pair assigned to a particular art object may be consider as a unique, inalterable, and non-reproducible radioactive signature assigned to said particular art object.

While the description of my invention contains many specificities, these should not be construed as limitations on the scope of the invention, but rather as an exemplification of one preferred embodiment thereof. Many other variations are possible. For example, the overall shape of the Label-Source does not necessarily need to be in the form of a circular disc, nor the overall shape of the Master-Source needs to be in the form of a rectangular plate. Accordingly, the scope of the invention should be determined not by the embodiments illustrated, but by the appended claims and their legal equivalents.

I claim:

1. A method to confirm the authenticity of art objects comprising (a) fabricating a pair of sealed radioactive sources emitting identical gamma-ray spectra unique to said pair (b) assigning said pair of sealed radioactive sources to a particular art object (c) attaching one of said sealed radioactive sources of said pair to the body of said particular art object using fastening means (d) inscribing on the surface of the other one of said sealed radioactive sources of said pair information relevant to the authenticity of said particular art object (e) assaying at a later date said sealed radioactive sources to obtain their respective gamma-ray spectra using energy-responsive gamma-ray detecting means (f) comparing to one another said obtained gamma-ray spectra so as to verify that they are identical.

2. The method according to claim 1 wherein said sealed radioactive sources are prepared by dispensing a solution of a plurality of gamma-ray emitting radioisotopes inside a cavity fabricated in the bodies of said radioactive sources.

3. The cavity of claim 2 wherein said cavity is fabricated in the form of a truncated right circular cone with an opening in the smaller base of said truncated right circular cone.

4. The method according to claim 2 wherein said plurality of gamma-ray emitting radioisotopes is confined inside said cavity by sealing the opening of said cavity with sealing means.

5. The sealing means of claim 4 wherein said sealing means is a metallic body that is compressed inside said cavity.

6. The method according to claim 1 wherein said sealed radioactive sources of said pair contain a plurality of gamma-ray emitting radioisotopes that is unique to said pair.

7. The plurality of gamma-ray emitting radioisotopes of claim 6 wherein said plurality of gamma-ray emitting radioisotopes is selected from the group consisting of gamma-ray emitters Al-26,Ti-44 Cd-113m,Sn-121m,Cs-137,Pm-145,Sm-151,Eu-152,Eu-154,Tb-157 and Bi-207.

* * * * *